United States Patent [19]

Sexton

[11] Patent Number: 4,512,191

[45] Date of Patent: Apr. 23, 1985

[54] AIR PURIFICATION SYSTEM MONITOR

[75] Inventor: John M. Sexton, Pleasant Garden, N.C.

[73] Assignee: Pressure Systems, Inc., Pleasant Garden, N.C.

[21] Appl. No.: 455,271

[22] Filed: Jan. 3, 1983

[51] Int. Cl.[3] .............................................. G01N 1/00

[52] U.S. Cl. ...................................... 73/337.5; 73/337

[58] Field of Search .................... 73/336.5, 337, 337.5, 73/29; 340/602; 338/35; 200/61.06; 236/44 A

[56] References Cited

U.S. PATENT DOCUMENTS

| | | | |
|---|---|---|---|
| 1,282,196 | 10/1918 | Cushing | 73/337.5 |
| 2,122,000 | 6/1938 | Beasley et al. | 73/337.5 |
| 2,722,826 | 11/1955 | Milligan et al. | 73/29 |

*Primary Examiner*—Charles Frankfort
*Assistant Examiner*—David R. Schuster

[57] ABSTRACT

An air purification system monitor having an encapsulating cartridge for housing a humidistat to monitor the limits of humidity within a highly pressurized system having adjustable switch points from 0 to 70% relative humidity in a pressure range of from 0 to 5,000 p.s.i.g. with said encapsulating cartridge having electrical contacts associated with the humidistat to transmit a signal to a remote location.

4 Claims, 9 Drawing Figures

AIR PURIFICATION SYSTEM MONITOR

BACKGROUND AND OBJECTIVES OF THE PRESENT INVENTION

The use of humidistats designed to control humidifying or dehumidifying equipment has been utilized in various industrial applications where critical high or high value products are to be maintained within a specific humidity range, and a single humidistat may be applied to be utilized as an operating and a cutout control with alarm contacts being wired to indicate when the cutout control is functioning. Both audible and visual alarms may be utilized in conjunction with standard humidistats that are presently available.

However, the present air purification system monitor is utilized as an alarm for continuous monitoring of moisture in respiratory air purification systems used by firemen, divers and others who require the use of respiratory air in hostile environments. Air under compression for respiratory air must have its moisture monitored carefully and the purification system monitor prevents the system from producing unsafe air by alarming before chemical cartridge life has fully expired by presetting the monitor to alarm at a predetermined relative humidity which may be equivalent to a 35° F. pressure dew point at 70° ambient temperature for any other desirable monitoring controls that may be preset depending upon the purification system and the end characteristics desired.

Therefore, it is an objective of the present invention to provide a purification system monitoring cartridge to be used in conjunction with a purification system of high pressure air in which the air may be employed for respiratory purposes by continuously monitoring the moisture through a humidistat within the cartridge that contains electrical contacts to be connected to a visual or audible alarm system in the event the preset condition is not in compliance with the air passing through the system.

Yet another objective of the present invention is to provide a high pressure encapsulating cartridge for housing a humidistat through which housing respiratory air under high pressure and controlled humidification may flow under continuous monitoring without impairing the operability of the system but to signal any malfunctioning by sensing the relative humidity of the pressurized air flowing through the system.

Various types of humidistats and moisture detecting systems including a humidity sensor alarm unit are disclosed in U.S. Pat. Nos. 2,593,313; 3,077,774; 3,315,518; 3,426,341; 3,763,338; 4,083,030; and 4,092,663. However, the aforementioned references do not disclose the present concept.

SUMMARY OF THE INVENTION

An air purification system monitor in which a sensing humidistat is encapsulated within a high pressure vessel operative within the pressure range of 0 to 5,000 p.s.i.g. and within the range of 0 to 70% relative humidity with the sensing element having means for emitting an electrical signal to an audible and visual alarm when service is required for the purification system to prevent unsafe air from being produced due to neglected maintenance and to activate the shutdown of an air compressor automatically.

DETAILED DESCRIPTION OF PREFERRED EMBODIMENT OF THE INVENTION

Figure 4:
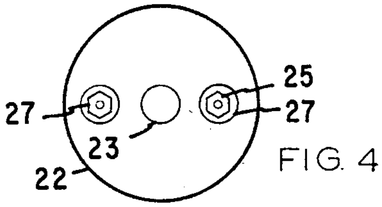
FIG. 4 is a bottom plan view of FIG. 2.
Figure 2:
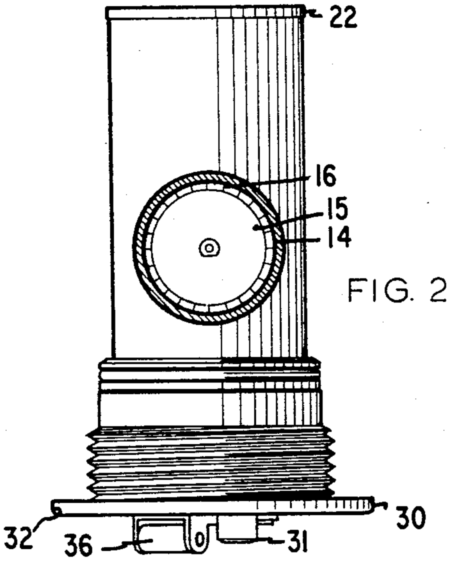
FIG. 2 is an elevational view of the top portion of the system monitor housing a humidistat therein.

Referring to the drawings and specifically to FIGS. 1–4, there is illustrated an air purification system monitor 10 in which a humidistat 11 is housed within the chamber 13 formed by the cylindrical plastic shell 12 that is provided with an opening 14 for exposing the humidistat adjusting dial 15 for controlling the setting on the dial through the calibration marks 16 thereon.

The humidistat 11 may be of Type W43A distributed by Johnson Controls, Inc. of 1302 East Monroe St., Goshen, Ind. 46526, for a SPDT humidity controller for low or line voltage in which critical or high value products are to be maintained within a specific humidity range and in which the humidistat sending element is composed of approximately 210 strands of carefully selected, specially treated human hair which has proven to be the most sensitive and dependable material for humidity control.

The electrical connections for the humidity controller 11 are standard and will be connected to the terminals 17 and 18 which extend axially through the top threaded plug 19 which is provided with an axial opening 20 at the top portion 21 thereof for connection by a suitable connector to be lead to an audible and/or visual signaling device positioned at a suitable location for signaling that maintenance must be performed since the humidistat has sensed conditions that are unacceptable to the prescribed setting of the humidistat control. The cylindrical plastic shell 12 is supported at the lower end by the closure member 22 that is provided with a central inlet opening 23 through which air may enter into the chamber 13 to communicate with the humidistat 11. Longitudinally extending rods 24 are threadably retained in suitable openings 25 drilled and tapped in the bottom portion 26 of plug 19 with suitable fastening nuts 27 supporting plate 22 in position.

The terminals or conductors 17 and 18 extend downwardly through suitable insulators and air seals to prevent short circuiting and arcing as well as air leakage into the humidistat 11 so that the lugs 28 which have conductor supporting means thereon will retain a conductor from the humidistat to a source of electrical power.

The top cover plate or shield 30 is dished downwardly to form a flange 32 with the cover member 30 being secured by the Allen head screws 31 that are retained in threaded openings 33 which are drilled ad tapped into the plug 19.

A hinged spring cover member 34 is mounted by means of the screws 35 on the top cover member 30 and is provided with a suitable hinge 36 so that the cover plate 37 having a lift section 38 thereon may be lifted to expose the terminals 17 and 18 for plug reception and connection when the air purification system monitor is connected to a visual and/or audible signal system, not shown.

Figure 3:
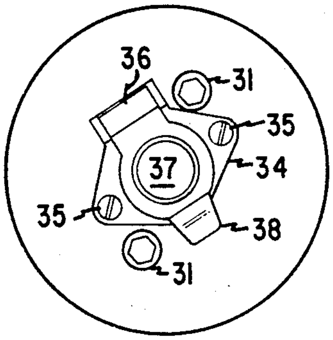
FIG. 3 is a top plan view of FIG. 2.
Figure 1:
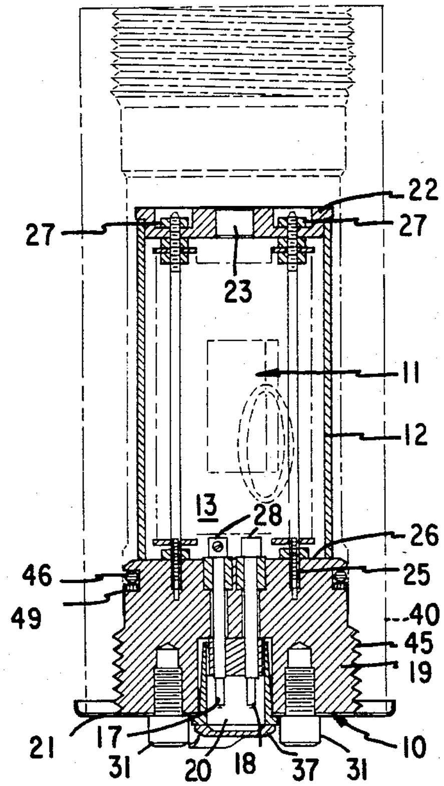
FIG. 1 is a longitudinal partial sectional view of an air purification system monitor with portions removed and the cylinder exterior shown in outline form.
Figure 8:
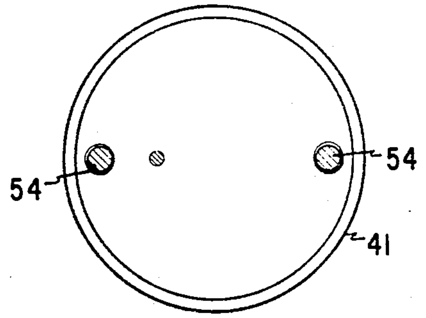
FIG. 8 is a bottom plan view of FIG. 5.
Figure 9:
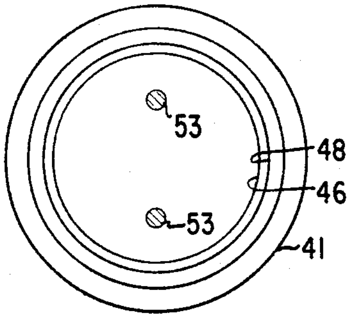
FIG. 9 is a top plan view of FIG. 7.
Figure 5:
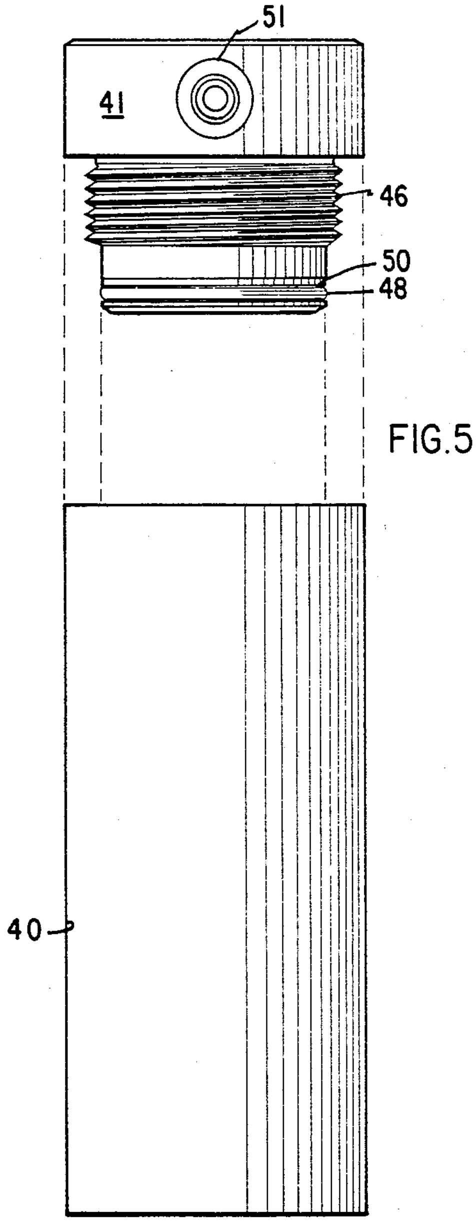
FIG. 5 is an exploded view of the cylindrical portion of the cartridge and the end plug which threadably engages with one end of the cylindrical cartridge through which air will flow into and out of the cartridge.
Figure 7:
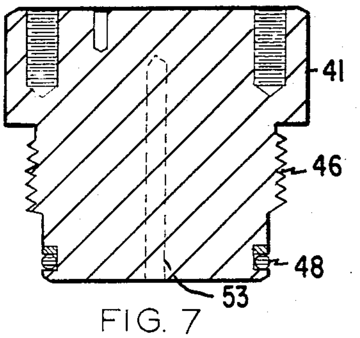
FIG. 7 is a sectional view of the bottom plug rotated 180° from that shown in FIG. 5.

The outer cylindrical housing 40, shown in outline form only, in FIG. 1 has omitted therefrom the lower closure plug 41 shown in FIGS. 5 and 7. The plate 22 shown in FIGS. 3 and 4 is retained in position by means of the retaining nuts 27 at the ends of the rods 25 with the central opening 23 in plate 22 for permitting inlet and exhaust of air under pressure within the housing 40 to be freely admitted into the humidistat 11 for it to be actuated by the flow of air therethrough.

Figure 6:
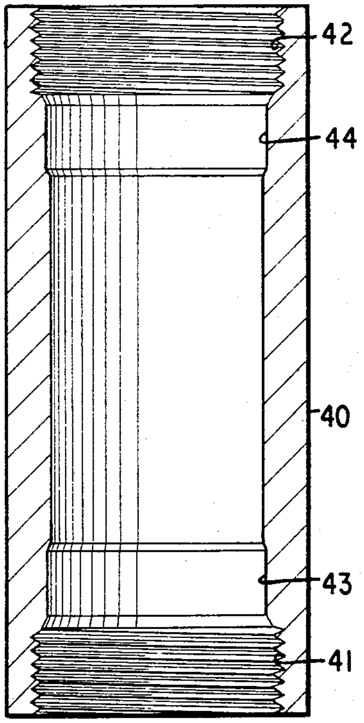
FIG. 6 is a longitudinal sectional view of the cylindrical cartridge omitting the end plugs.

The cylindrical housing 40 shown in FIGS. 5 and 6 is accurately machined to provide the internal threads 41 at the top portion and internal threads 42 at the bottom portion with the indentations 43 and 44 to receive the plugs 19 and 41 by the cooperating threads 45 and 46 which threadably engage the internal theads 41 and 42, respectively, in the ends of the cylindrical sleeve or body 40.

Each of the stepped plugs 19 and 41 is provided with an O-ring 46 and 48 within the recess 49 for O-ring and recess 50 for O-ring 48 thereby forming an airtight seal between the plugs 19 and 41 with the cylindrical housing 40.

Plug 41 is provided with an air inlet opening through which purified air under pressure may enter and pass through the passageway 52 into the interior of the cylindrical housing 40 and discharge through passageway 53 which is provided diametrically opposite the passageway 52 to communicate with a discharge opening similar to 51 that is diametrically opposite from that shown in FIG. 5, but unshown, to discharge the purified air to the ultimate use after it has been monitored in the air purification system monitor 10.

The base of the plug 41 is provided with threaded blind openings 54 for suitable mounting of the monitor on a frame or to facilitate opening the plug be inserting appropriate studs that may be used to rotate the plug into locking engagement or to release the plug 41 from locked engagement.

It will be readily apparent to those skilled in the art that many modifications and variations may be made to the various components within the assembly without departing from the purpose and spirit of this invention and such modifications will be apparent to those skilled in the art within the basic concept and are contemplated within the appended claims.

It is further contemplated that the switch point for adjustability of the humidistat may range from 0% to 70% relative humidity depending on the end utilization of the air and that the pressure range in which the air purification monitor may function, depending upon the materials employed and the testing conditions, may range from 0 to 5,000 p.s.i.g.

I claim:

1. An air purification system monitor comprising; a pressure vessel having a hollow cylindrical body including threaded openings at each end thereof, an end plug having air inlet and discharge openings threadably retained in said cylindrical body at one end to admit air into said cylindrical body, a humidistat-supporting end plug threadably retained in said cylindrical body at the other end, said humidistat-supporting end plug having an axial opening therethrough and a humidistat-retaining housing mounted thereon for retention in said cylindrical body and having an opening to receive air therein from said cylindrical body, a humistat mounted in said humidistat-retaining housing, said humidistat having sealed and insulated electrical conductor terminals extending from said humidistat into said plug axial opening for connection to an audible or visual signaling device upon humidistat detection of conditions varying from preset conditons.

2. An air purification system monitor as claimed in claim 1, said humidistat connected terminals extend into said axial opening, and means for insulating said terminals from each other and sealing said axial opening from air leakage.

3. An air purification system monitor as claimed in claim 1, a shield mounted on said humidistat-supporting end plug, and a closure member secured to said shield for releasably covering said axial opening.

4. An air purification system monitor as claimed in claim 1, said plugs having sealing O-rings to seal the cylindrical body from contamination and air leakage and infiltration.

* * * * *